UNITED STATES PATENT OFFICE.

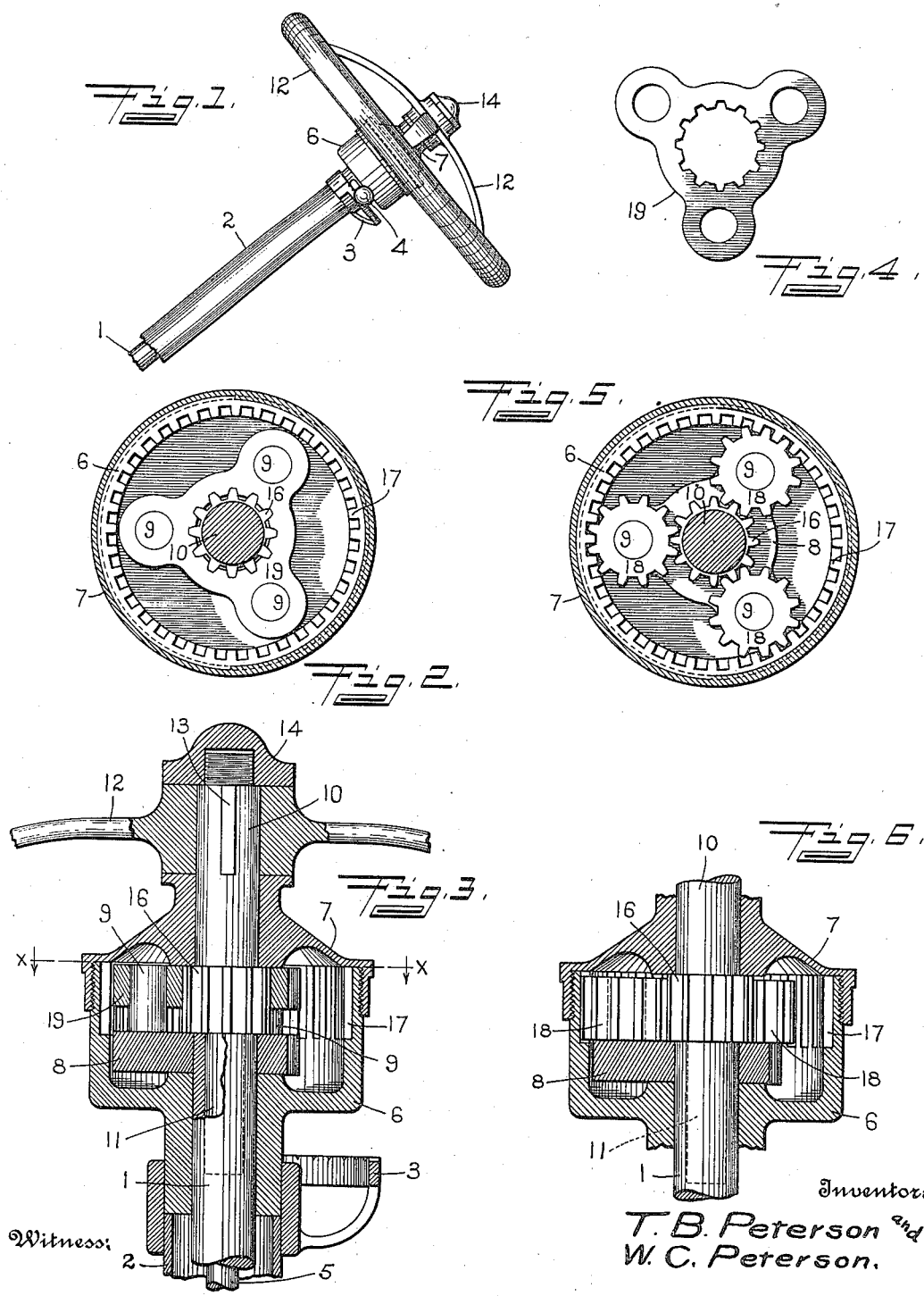

THORWALD B. PETERSON AND WINFORD C. PETERSON, OF OMAHA, NEBRASKA, ASSIGNORS TO E. H. SPRAGUE MANUFACTURING COMPANY, OF OMAHA, NEBRASKA, A CORPORATION OF NEBRASKA.

MOTOR-VEHICLE STEERING MECHANISM.

1,224,869. Specification of Letters Patent. Patented May 1, 1917.

Application filed September 13, 1915. Serial No. 50,502.

*To all whom it may concern:*

Be it known that we, THORWALD B. PETERSON and WINFORD C. PETERSON, citizens of the United States, and residents of Omaha, in the county of Douglas and State of Nebraska, have invented certain new and useful Improvements in Motor-Vehicle Steering Mechanism, of which the following is a specification.

Our invention relates to steering mechanism for motor-vehicles, and it is the object thereof to provide a simple and inexpensive means for changing the ratio of movement between the steering hand-wheel of such a vehicle and the parts actuated by said wheel.

In the accompanying drawings, Figure 1 is a side view of that portion of the steering mechanism to which our device is applied, Fig. 2 is a transverse section of the mechanism on the plane of the line $x$—$x$ of Fig. 3, Fig. 3 is a longitudinal or axial section of the mechanism, Fig. 4 is a detail end view of the connecting spider, Fig. 5 is a transverse sectional view similar to Fig. 2 but showing the planetary connection, and Fig. 6 is a longitudinal section similar to Fig. 3 but showing the planetary connection.

In certain light motor-vehicles, and particularly in the well-known and extensively used "Ford" machines, the lower end of the inclined steering-shaft has a crank secured directly thereon, from which the usual connections extend to the vehicle-wheels. At the upper end of the steering-shaft, and operatively connecting the same with the hand-wheel, there is a speed-changing planetary-gear device, such that a number of revolutions of the hand-wheel are required to cause one revolution of the shaft. The said geared connection, being reversible, permits the vibrations of the vehicle-wheels to be transmitted to the hand-wheel, and obliges the driver of the car to constantly hold the hand-wheel to prevent deflection of the vehicle-wheels by obstructions in and irregularities of the road.

In such vehicles as the foregoing it is desirable to substitute for the simple crank, at the lower end of the steering-shaft, an irreversible speed-reducing device such as the ordinary worm-and-gear connection which is employed as a standard feature of nearly all other motor-vehicles. When such connecting means are provided at the lower end of the steering-shaft, however, the planetary speed-reducing gearing between the hand-wheel and the upper end of the shaft is unnecessary and undesirable, and our invention provides a simple and inexpensive device which may be quickly substituted for a part of the planetary gearing, and by which the hand-wheel and shaft are, in effect, connected directly with each other.

In the drawings there is represented the upper end-portion of the steering-shaft 1, and the accompanying parts, of a motor-cycle of the kind above mentioned. Said shaft 1 is revoluble within the tubular stationary steering-column 2, which carries near its upper end notched segments 3 for the usual throttle and ignition controlling levers 4, from which rods 5 extend down through the column. On the upper end of the column 2 there is secured a cylindrical casing 6 of which the upper end is closed by a cover 7 screwed thereon. The upper end-portion of the shaft 1 is tubular and has a bearing in the hub or neck-portion of the casing 6. Within the lower part of the casing there is secured on the end of the shaft 1 a plate 8 on which are carried a plurality of studs 9, said studs extending parallel with the shaft and being spaced apart equidistantly at uniform radii from the shaft-axis. In the hub-portion of the casing-cover 7 there is journaled a stub-shaft 10 of which the lower portion is of reduced diameter and forms a stem 11 which fits revolubly within the bearing therefor formed by the tubular upper end of the shaft 1. The hand-wheel 12 is secured on the upper end of the stub-shaft by means of a key 13 and nut 14, as shown. On the portion of the stub-shaft within the casing 6 adjacent to the end of the shaft 1 there is secured a pinion 16, and upon the inside of the casing, coinciding longitudinally with said pinion 16, there is formed an annular or internal gear 17.

In the ordinary arrangement of the mechanism, wherein the hand-wheel is rotated at a greater speed than the shaft 1, pinions 18 are revolubly mounted on the studs 9, meshing at the inner side with the stub-shaft pinion 16, and at the outer side meshing with the annular gear 17, as shown in Figs. 5 and 6. Rotation of the hand-wheel and stub-shaft causes rotation of the plate 8 and shaft 1 in the same direction but at a slower rate, the ratio of movement being one greater than the ratio of the pitch diameters of the pinion 16 and gear 17. Thus, when the pitch diameter and number of teeth in the pinion 16 is one-third that of the annular gear, as in the structure illustrated, the speed ratio of the hand-wheel to the shaft 1 is 4:1.

When, for the reasons hereinbefore stated, it is desired to have the hand-wheel and the shaft 1 rotate at the same speed, we provide a plate or spider 19 having a central opening formed so as to fit upon and between the teeth of the pinion 16, and a plurality of arms having openings adapted to receive the studs 9. By unscrewing the cover 7 from the casing 6, said cover, the hand-wheel, the stub-shaft, and the pinion 16 are detachable from the other parts, and the pinions 18 may be slipped off the studs 9 and thus removed from the mechanism. Before replacing the cover and its associated parts, the spider 19 is placed upon the pinion 16, so that when the mechanism is reassembled the studs 9 pass into the openings therefor in the arms of the spider 19, as shown in Figs. 2 and 3. The stub-shaft 10 and shaft 1 are thus connected in fixed rotational relation, through the medium of the pinion 16, spider 19, studs 9 and plate 8. The substitution of the spider 19 for the pinions 18 does not involve the alteration of any part of the planetary connection formed when said pinions are in use, and said planetary connection may be restored at any time by merely removing the spider and replacing the pinions upon the studs 9.

Now, having described our invention, what we claim and desire to secure by Letters Patent is:

The combination with a motor-vehicle steering-mechanism having a steering-shaft, a hand-wheel, and members adapted to form parts of a planetary-gear connection between said wheel and shaft; said members including a stub-shaft carrying the wheel and alined with the steering-shaft, a pinion on the stub-shaft, a plate secured on the steering-shaft adjoining the pinion, and studs carried by the plate and extending alongside the pinion; of a spider having a central opening formed to fit removably upon and between the teeth of the pinion, and arms for engaging the studs to form a fixed rotational connection between the pinion and the plate.

T. B. PETERSON.
W. C. PETERSON.